United States Patent [19]

Hooper

[11] Patent Number: 4,804,147

[45] Date of Patent: Feb. 14, 1989

[54] PROCESS FOR MANUFACTURING AGGREGATE FROM ASH RESIDUE

[75] Inventor: William F. Hooper, Brandon, Fla.

[73] Assignee: Waste Management Energy Systems, Inc., Tampa, Fla.

[21] Appl. No.: 138,304

[22] Filed: Dec. 28, 1987

[51] Int. Cl.⁴ .............................................. B02C 19/12
[52] U.S. Cl. ............................... 241/24; 106/DIG. 1; 241/29
[58] Field of Search .................... 241/DIG. 38, 24, 29, 241/21, 79.1; 106/DIG. 1, 118, 900

[56] References Cited

U.S. PATENT DOCUMENTS

| | | | |
|---|---|---|---|
| 3,328,180 | 6/1967 | Ban | 106/DIG. 1 X |
| 4,336,069 | 6/1982 | Dodson et al. | 106/DIG. 1 X |
| 4,629,509 | 12/1986 | O'Hara et al. | 106/DIG. 1 X |
| 4,744,829 | 5/1988 | Eirich et al. | 106/DIG. 1 X |

Primary Examiner—Mark Rosenbaum
Attorney, Agent, or Firm—Dominik, Stein, Saccocio, Reese, Colitz & Van Der Wall

[57] ABSTRACT

A process for manufacturing aggregate from the ash residues resulting from incineration of municipal solid waste. Fly ash residue is added to bottom ash residue and oversized material is removed. The combined ash residue is mixed and ferrous metal is magnetically removed. The combined ash residue is comminuted and heavy metal immobilizing and volumetric stabilizing agents are added. Water is added to and mixed with the combined ash residue and stabilizing agents. The resulting mixture is retained for sufficient time to allow the immobilizing and stabilizing reactions to occur and weak agglomerations to form. The agglomerations are broken into individual particles before a solid mass is formed.

24 Claims, 1 Drawing Sheet

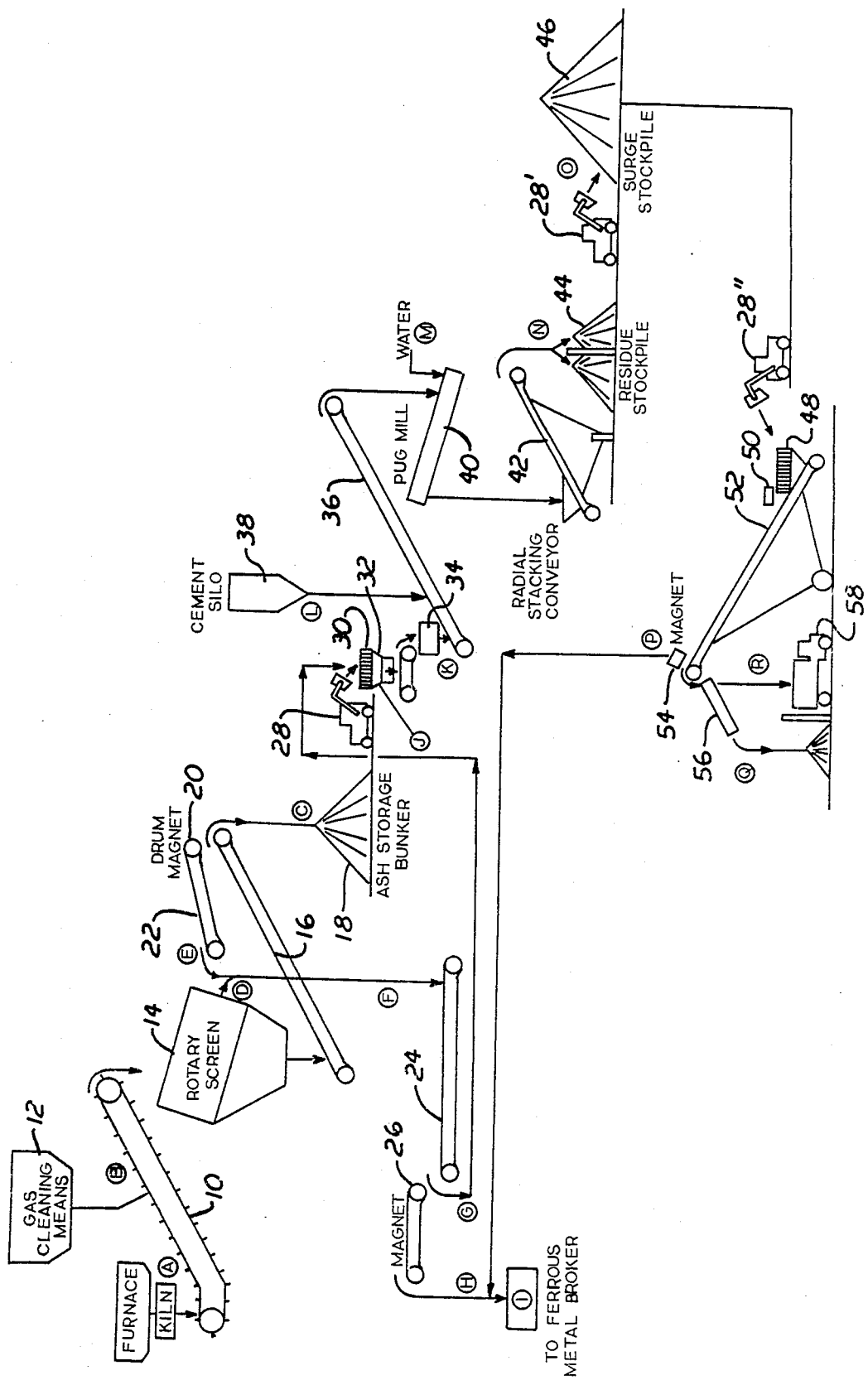

PROCESS FOR MANUFACTURING AGGREGATE FROM ASH RESIDUE

BACKGROUND OF THE INVENTION

This invention relates to a process for manufacturing aggregate from the fly ash and bottom ash residues resulting from incineration of municipal solid waste.

Municipal solid waste consists essentially of household waste and non-hazardous commercial and industrial solid waste of the type which is typically collected from churches, schools, offices, restaurants, stores and light industrial facilities by the waste collection organization serving a particular municipality or other similar community. Most of the cast-offs of daily living in a complex modern society are found in typical municipal solid waste. Thus, municipal solid waste typically includes garbage, paper, textiles, plastics, glass, ceramics, metals, rubber, rock, earth, wood and other combustible and noncombustible materials in a variety of forms.

Final disposal of municipal solid waste has become a major problem in many urban areas of the United States and other developed countries. While various methods have been proposed, land disposal and incineration are the two methods which are most commonly used for final disposal of municipal solid waste. With the most commonly used method of land disposal, municipal solid waste is transported to and deposited in a sanitary landfill. Municipal solid waste often is pulverized or otherwise compacted to decrease its volume prior to land disposal.

Whether or not municipal solid waste is pulverized or otherwise compacted, sufficient vacant land with a hydrogeologic structure which is suitable for use as a landfill is often not available in many urban areas of the United States and other developed countries. Accordingly, it is desirable to have a method for final disposal of municipal solid waste which does not require deposit of significant quantities of waste in a landfill. Incineration reduces the municipal solid waste volume by up to ninety percent. However, the residue remaining must still be deposited in a landfill. If the fly ash and bottom ash residues resulting from incineration can be used to manufacture useful by-products, the landfill requirement would be substantially reduced.

Mass burn incineration is the most commonly used method for incineration of municipal solid waste. With mass burn incineration, non-hazardous, processable solid waste collected by the waste collection organization serving the particular municipality or other similar community is fed into an incinerator. With a less commonly used method, non-hazardous solid waste is processed in remove ferrous and non-ferrous metals, recycleable materials and identifiable non-combustible materials and then fed into an incinerator as refuse derived fuel. Steam for heating or electric power production is often a useful by-product of incineration. However, even when identifiable non-combustible material has been separated from combustible material prior to incineration, incineration of typical municipal solid waste generates significant quantities of fly ash and bottom ash residues containing ferrous and nonferrous metals. Such ash residues are typically deposited in a landfill.

The fly ash and bottom ash residues from incineration of typical municipal solid waste have two characteristics which often prevent their direct and immediate use as by-products. First, since non-combustible metals are present in typical municipal solid waste, such ash residues typically contain leachable heavy metals, such as lead and cadmium, which could constitute a potential hazard to the environment, including surface water supplies and aquifiers, if they are present in sufficient quantities and not managed properly. Second, each of such ash residues typically is volumetrically unstable for several months. Volumetric expansion will cause structural damage if either of such ash residues is used as a construction material during the period of instability.

A method of immobilizing leachable heavy metals in the fly ash residue resulting from incineration of municipal solid waste with lime and an inorganic sulfide is disclosed in U.S. Pat. No. 4,629,509. With that method, dry lime and an aqueous solution of a soluble inorganic sulfide are mixed with the fly ash residue following its discharge from a precipitator. While leachable heavy metals would appear to be effectively immobilized by that method, U.S. Pat. No. 4,629,509 does not disclose stabilization of the fly, bottom or combined ash residue to prevent volumetric expansion. Furthermore, no method or process for manufacturing any useful by-product from the fly, bottom or combined ash residue is disclosed by U.S. Pat. No. 4,629,509.

SUMMARY OF THE INVENTION

The present invention provides a method for manufacturing aggregate from ash residue. More particularly, the present invention provides a process for manufacturing aggregate from the fly ash and bottom ash residues resulting from incineration of municipal solid waste.

Bottom ash residue is quenched in water following its discharge from an incinerator. Fly ash residue discharged from one or more combustion gas cleaning means is added to the quenched bottom ash residue to form a combined ash residue. Identifiable ferrous metal objects, nonferrous metal, quenched slag, charred wood and the like are removed from the combined ash residue by screening. The combined ash residue is mixed and additional ferrous metal is removed. Then, the combined ash residue is comminuted to create an average particle size and a particle size distribution approximating that which is desired for the final aggregate.

Approximately four to five percent by weight of Portland cement and sufficient water for mixing and reacting are added to and mixed with the combined ash residue following comminution. The Portland cement, water and combined ash residue mixture is retained for sufficient time to allow formation of weak agglomerations. However, the agglomerations are broken up before a solid concrete mass is formed. The broken-up agglomerations are processed in a sizing conditioner to form individual aggregate particles. Additional ferrous metal is removed from the aggregate following processing in the sizing conditioner and the aggregate is screened to remove the remaining oversize.

The aggregate manufactured by the process of the present invention fully conforms to the standards for non-hazardous waste established by the Environmental Protection Agency (EPA). The aggregate is volumetrically stable and fully conforms to all requirements for bituminous concrete aggregates classified as local materials by the Florida Department of Transportation Standard Specification for Road and Bridge Construction. The aggregate also is believed to be suitable for other uses requiring compliance with other product standards.

These and many other advantages, features and objects of the present invention will be apparent from the following brief description of the drawing, description of the preferred embodiment and claims, and the accompanying drawing.

BRIEF DESCRIPTION OF THE DRAWING

The drawing is a schematic showing suitable equipment and the material flow for one embodiment of the process of the present invention. Reference numerals are used on the drawing to indicate equipment for transporting and processing material and material storage at various points in the process. The materials which are present at various points in the process are indicated by referenced letters on the drawing and identified in the following table.

| POINT | MATERIAL |
| --- | --- |
| A | Bottom Ash |
| B | Fly Ash |
| C | Combined Ash |
| D | Trommel Oversize |
| E | Ferrous Metal |
| F | Separator Feed |
| G | Unremoved Material |
| H | Ferrous Metal |
| I | Recovered Ferrous Metal |
| J | Grissly Oversize |
| K | Crusher Feed |
| L | Cement |
| M | Water |
| N | Residue/Cement Mixture |
| O | Unsized Aggregate |
| P | Ferrous Metal |
| Q | Oversize Rejects |
| R | Final Aggregate |

DESCRIPTION OF THE PREFERRED EMBODIMENT

Suitable equipment and the material flow for one embodiment of the process of the present invention are illustrated schematically in the drawing. As illustrated, a continuous incinerator which includes a furnace and rotary kiln is used for mass burn incineration of municipal solid waste. The heated combustion gases from the incinerator are used to generate steam for electric power production. Combustion gas cleaning means remove uncombusted particulate materials, commonly referred to as fly ash or fly ash residue, from the heated combustion gases prior to the discharge of such gases to the atmosphere. Heavier uncombusted materials, commonly referred to as either bottom ash or bottom ash residue, which consist of approximately twenty percent by weight of the municipal solid waste fed into the incinerator are discharged from the incinerator into a water quench trough.

Referring to the drawing, bottom ash residue (point A) is removed from the quench trough by an inclined drag chain conveyor 10. Quench water drains and evaporates from bottom ash residue as it moves up the incline. At the approximate midpoint of the incline, fly ash residue (point B) from a combustion gas cleaning means 12, such as an electrostatic precipitator, is deposited on the drag chain conveyor 10. While not essential for the practice of this embodiment of the process, the fly ash residue can be first transported to a storage silo (not illustrated) by a pneumatic conveyor (not illustrated) following its discharge from the combustion gas cleaning means 12 and then transported from the storage silo to the drag chain conveyor 10 by a screw conveyor (not illustrated). A storage silo between the combustion gas cleaning means 12 and the drag chain conveyor 10 would function as a surge retainer for the fly ash residue discharged from the combustion gas cleaning means 12, and, thereby, assure continuous efficient operation of the combustion gas cleaning means 12 during periods of non-operation of the drag chain conveyor 10.

With this embodiment of the process, the ratio of bottom ash residue to fly ash residue is approximately twelve to one by weight. However, the process of the present invention is believed to be capable of accommodating any ratio of bottom ash residue to fly ash residue which results from incineration of municipal solid waste. Furthermore, while scrubber residue is not intended to be processed with this embodiment, the process is believed to be capable of processing scrubber residue and the like if one or more acid gas scrubbers or the like are used at a particular incineration facility.

The drag chain conveyor 10 transports the bottom ash residue and fly ash residue to the inlet of a declined rotary screen 14 having a plurality of approximately one and one-fourth inch diameter circular openings. As the screen 14 rotates, quench water continues to drain and evaporate from the bottom ash residue while the bottom ash residue and fly ash residue are mixed on its interior surface. As the bottom ash residue and fly ash residue are mixed, the resulting mixture passes through the openings of the rotary screen 14 and is deposited on an inclined belt conveyor 16 as combined ash residue (point C). Then the belt conveyor 16 transports the combined ash residue to an ash residue storage bunker 18.

The trommel oversize (point D), i.e. all material which does not pass through the screen openings, is discharged from the rotary screen 14 at its outlet. Typically, the trommel oversize includes identifiable ferrous metal objects, such as wheel rims and other automobile parts, plated tableware, small appliances, hardware, toys, cans and angle iron, nonferrous metal, construction rubble, quenched slag and charred wood. A drum magnet 20 removes ferrous metal (point E), including nuts, bolts, screws, nails and other small identifiable ferrous metal objects, from the combined ash residue on the belt conveyor 16 immediately prior to the discharge of the combined ash residue from the belt conveyor 16 to the ash residue storage bunker 18. A declined belt conveyor 22 transports the ferrous metal which is so removed to the outlet end of the rotary screen 14 where it is combined with the trommel oversize discharged from the rotary screen 14. The trommel oversize and ferrous metal are deposited on a horizontal belt conveyor 24 as separator feed (point F). The belt conveyor 24 transports such feed to a magnetic separator 26.

Following magnetic separation, the unremoved material (point G) discharged from the belt conveyor 24 primarily consists of nonmagnetic trommel oversize, such as nonferrous metal, construction rubble, quenched slag and charred wood. However, since neither the rotary screen 14 nor the magnetic separator 26 is a perfect separation means, some combined ash residue and ferrous metal remains in the unremoved material. Thus, the unremoved material is transported by a front end loader 28 to a grizzly screen 30 for further processing as hereinafter described. The ferrous metal (point H) removed from the belt conveyor 24 by the magnetic separator 26 is stockpiled and subsequently combined with the ferrous metal removed from the aggregate as hereinafter described to create recovered ferrous metal (point I) for subsequent sale to a ferrous metal broker.

The combined ash residue is retained in the ash residue storage bunker 18 for approximately twenty-four hours to allow further drainage and evaporation of the quench water. After approximately twenty-four hours in the ash residue storage bunker 18, the combined ash residue usually contains approximately fifteen to twenty percent by weight of water. It is important to establish and maintain a relatively constant percentage by weight of water in the combined ash residue at this point of the process since the quantities of all reagents and water added to the combined ash residue at subsequent points in the process are calculated on a weight basis.

The front-end loader 28 is used to deposit combined ash residue from the ash residue storage bunker 18 and unremoved material discharged from the belt conveyor 24 on a grizzly screen 30 having approximately two inch spacings between a plurality of parallel bars. The grizzly oversize (point J), i.e. all material remaining on the screen 30, is transported from the facility to a landfill for final disposal. The material which passes through the grizzly screen 30, i.e. combined ash residue, enters a hopper 32 as the feed (point K) for a crusher 34. The crusher 34 comminutes the feed to an average particle size and a particle size distribution which conforms to the requirements for bituminous concrete aggregate classified as local materials by the Florida Department of Transportation Standard Specification for Road and Bridge Construction. With that specification, one hundred percent of the aggregate must pass through a mesh screen having a plurality of approximately three-eighth inch openings.

After comminution, the combined ash residue is discharged from the crusher 34 and deposited on an inclined belt conveyor 36. The belt conveyor 36 passes over an automatic scale (not illustrated) which weighs the combined ash residue and transmits electronic signals to a ratio controller (not illustrated). The ratio controller calculates the quantities of reagents and water which are added at subsequent steps in the process and controls all valve settings for the means for adding reagents and water.

Two types of reagents must be added to the combined ash residue, a heavy metal immobilizing agent and a volumetric stabilizing agent. It has been established by experimentation that certain alkaline materials, i.e. Portland cement, lime, gypsum, caustic soda, magnesium oxide and sodium hydroxide, are effective for immobilizing heavy metals contained in the combined ash residue. Portland cement is preferred because of its relatively low cost and its effectiveness as a volumetric stabilizing agent as hereinafter discussed. Approximately four to five percent by weight of Type I Portland cement is required to immobilize the heavy metals typically contained in the fly ash and bottom ash residues resulting from incineration of typical municipal solid waste such that the final aggregate consistently conforms to the standards for non-hazardous waste established by the Environmental Protection Agency (EPA).

It has been established by experimentation that two silicate bearing materials, Portland cement and sodium silicate, are effective for volumetrically stabilizing the combined ash residue. While the exact stabilization mechanism is not known, it is believed that these reagents accelerate the hydration of the calcium oxide and magnesium oxide in the combined ash residue. If Portland cement or sodium silicate is not added to the combined ash residue, approximately four to six months is required for volumetric stabilization by naturally occurring hydration of calcium oxide and magnesium oxide. Portland cement is preferred because of its relative low cost and its effectiveness as a heavy metal immobilizing agent as discussed above. Approximately three percent by weight of Type I Portland cement is required to volumetrically stabilize the combined ash residue.

Approximately four to five percent by weight of Type I Portland cement (point L) is discharged from a cement silo 38 and deposited on the belt conveyor 36. The conveyor 36 transports the combined ash residue and cement to a mixer 40. Sufficient water (point M) is added in the mixer 40 for efficient mixing and chemical reactions. And, the combined ash residue and cement are continuously mixed and discharged as a combined ash residue and cement mixture.

The combined ash residue and cement mixture which is discharged from the mixer 40 is deposited on a radial stacking conveyor 42. The stacking conveyor 42 forms a conical stockpile 44 of the combined ash residue and cement mixture from each day of operation of the mixer 40. The combined ash residue and cement mixture (point N) is retained in the conical stockpile 44 for approximately twelve to eighteen hours to allow partial hydration of the cement. And, while hydration of calcium oxide and magnesium oxide in the combined ash residue occurs naturally at a slow rate prior to this point in the process, it is believed that accelerated hydration of such calcium oxide and magnesium oxide occurs in the conical stockpile 44. After twelve to eighteen hours, the front-end loader 28' is used to break up the resulting weak agglomerations in the conical stockpile 44 before a solid concrete mass has formed and transport the resulting unsized aggregate (point O) to a larger surge stockpile 46.

From time to time thereafter, the front-end loader 28" is used to transport unsized aggregate from the surge stockpile 46 to a feed hopper 48 which discharges into a sizing conditioner 50. The sizing conditioner 50 breaks up oversized agglomerations such that the aggregate has essentially the same average particle size and particle size distribution as that of the combined ash residue discharged from the crusher 34 and discharges the aggregate onto an inclined conveyor/separation screen 52. Ferrous metal (point P) is removed by a final magnetic separator 54 at the top of the screen 52, combined with earlier removed ferrous metal and sold to a ferrous metal broker as recovered ferrous metal (point I). After removal of ferrous metal, the aggregate is deposited on the surface of a vibrating screen 56 having a plurality of approximately one-eighth inch mesh openings. Oversized agglomerations which remain on the screen 56 are recycled to the maximum extend possible. Oversized agglomerations (point Q) which are not recycled are transported to a landfill for final disposal. The final aggregate which passes through the mesh openings (point R) is transported from the facility in a delivery vehicle 56 and sold for use as a bituminous concrete aggregate.

The aggregate which is manufactured by this embodiment of the process of the present invention fully conforms to the standards for non-hazardous waste established by the Environmental Protection Agency (EPA). The aggregate is volumetrically stable and fully conforms to all requirements for bituminous concrete aggregates classified as local materials by the Florida Department of Transportation Standard Specification for Road and Bridge Construction. The aggregate also is believed to be suitable for other uses requiring compliance with other standards.

While the present invention has been disclosed in connection with its preferred embodiment, there may be other embodiments which fall within the scope and spirit of the invention as defined by the following claims.

I claim:

1. A process for manufacturing aggregate from ash residue, comprising the steps of:
   (a) comminuting the ash residue to create an average particle size and a particle size distribution approximating that which is desired for the final aggregate;
   (b) adding a heavy metal immobilizing agent and a volumetric stabilizing agent to the ash residue;
   (c) adding sufficient water for effectively mixing and reacting said heavy metal immobilizing agent and said volumetric stabilizing agent with the ash residue;
   (d) mixing said heavy metal immobilizing agent, said volumetric stabilizing agent and said water with the ash residue;
   (e) retaining the resulting mixture of said heavy metal immobilizing agent, said volumetric stabilizing agent, said water and the ash residue for sufficient time to allow the immobilizing and stabilizing reactions to occur and weak agglomerations to form; and
   (f) breaking up said weak agglomerations into individual particles before a solid mass is formed.

2. A process for manufacturing aggregate as recited in claim 1, wherein said heavy metal immobilizing agent is an alkaline material.

3. A process for manufacturing aggregate as recited in claim 1, wherein said heavy metal immobilizing agent is either Portland cement, lime, gypsum, caustic soda, magnesium oxide or sodium hydroxide.

4. A process for manufacturing aggregate as recited in claim 1, wherein said heavy metal immobilizing agent is Portland cement.

5. A process for manufacturing aggregate as recited in claim 4, wherein said Portland cement is added in amounts of approximately four percent to five percent by weight.

6. A process for manufacturing aggregate as recited in claim 1, wherein said volumetric stabilizing agent is a silicate bearing material.

7. A process for manufacturing aggregate as recited in claim 1, wherein said volumetric stabilizing agent is either Portland cement or sodium silicate.

8. A process for manufacturing aggregate as recited in claim 1, wherein said volumetric stabilizing material is Portland cement.

9. A process for manufacturing aggregate as recited in claim 8, wherein said Portland cement is added in amounts of at least approximately three percent by weight.

10. A process for manufacturing aggregate as recited in claim 1, wherein said heavy metal immobilizing agent and said volumetric stabilizing agent are both Portland cement.

11. A process for manufacturing aggregate as recited in claim 10, wherein said Portland cement is added in a total amount of approximately four percent to five percent by weight.

12. A process for manufacturing aggregate as recited in claim 11, wherein the resulting mixture of said Portland cement, said water and the ash residue is retained for approximately twelve hours to eighteen hours to allow the immobilizing and stabilizing reactions to occur and weak agglomerations to form.

13. A process for manufacturing aggregate from the bottom ash and fly ash residues resulting from incineration of municipal solid waste comprising the steps of:
   (a) quenching the bottom ash residue in water immediately following its discharge from an incinerator;
   (b) adding the fly ash residue discharged from a combustion gas cleaning means to the quenched bottom ash residue;
   (c) screening the bottom ash residue and the fly ash residue to remove oversized material;
   (d) mixing the bottom ash residue and the fly ash residue to form a combined ash residue;
   (e) magnetically removing ferrous metal from said combined ash residue;
   (f) comminuting said combined ash residue to create an average particle size and a particle size distribution approximating that which is desired for the final aggregate;
   (g) adding a heavy metal immobilizing agent and a volumetric stabilizing agent to said combined residue;
   (h) adding sufficient water for effectively mixing and reacting said heavy metal immobilizing agent and said volumetric stabilizing agent with said combined ash residue;
   (i) mixing said heavy metal immobilizing agent, said volumetric stabilizing agent and said water with said combined ash residue;
   (j) retaining the resulting mixture of said heavy metal immobilizing agent, said volumetric stabilizing agent, said water and said combined ash residue for sufficient time to allow the immobilizing and stabilizing reactions to occur and weak agglomerations to form; and
   (k) breaking up said weak agglomerations into individual particles before a solid mass is formed.

14. A process for manufacturing aggregate as recited in claim 13, wherein said heavy metal immobilizing agent is an alkaline material.

15. A process for manufacturing aggregate as recited in claim 13, wherein said heavy metal immobilizing agent is either Portland cement, lime, gypsum, caustic soda, magnesium oxide or sodium hydroxide.

16. A process for manufacturing aggregate as recited in claim 13, wherein said heavy metal immobilizing agent is Portland cement.

17. A process for manufacturing aggregate as recited in claim 16, wherein said Portland cement is added in amounts of approximately four percent to five percent by weight.

18. A process for manufacturing aggregate as recited in claim 13, wherein said volumetric stabilizing agent is a silicate bearing material.

19. A process for manufacturing aggregate as recited in claim 13, wherein said volumetric stabilizing agent is either Portland cement or sodium silicate.

20. A process for manufacturing aggregate as recited in claim 13, wherein said volumetric stabilizing agent is Portland cement.

21. A process for manufacturing aggregate as recited in claim 20, wherein said Portland cement is added in amounts of at least approximately three percent by weight.

22. A process for manufacturing aggregate as recited in claim 13, wherein said heavy metal immobilizing agent and said volumetric stabilizing agent are both Portland cement.

23. A process for manufacturing aggregate as recited in claim 22, wherein said Portland cement is added in a total amount of approximately four percent to five percent by weight.

24. A process for manufacturing aggregate as recited in claim 23, wherein the resulting mixture of said Portland cement, said water and said combined ash residue is retained for approximately twelve hours to eighteen hours to allow the immobilizing and stabilizing reactions to occur and weak agglomerations to form.

* * * * *